US012654578B2

(12) United States Patent
Villanyi et al.

(10) Patent No.: US 12,654,578 B2
(45) Date of Patent: Jun. 16, 2026

(54) ELECTRIC VEHICLE SUPPLY EQUIPMENT FOR CHARGING AN ELECTRICAL VEHICLE

(71) Applicant: ABB E-mobility B.V., Delft (NL)

(72) Inventors: Balazs Villanyi, Delft (NL); Stefan Raaijmakers, Delft (NL); Lars Peter Bech, Schiedam (NL); Rolf Bilderbeek, Utrecht (NL)

(73) Assignee: ABB E-mobility B.V., Delft (NL)

( * ) Notice: Subject to any disclaimer, the term of this patent is extended or adjusted under 35 U.S.C. 154(b) by 795 days.

(21) Appl. No.: 17/535,729

(22) Filed: Nov. 26, 2021

(65) Prior Publication Data

US 2022/0080845 A1  Mar. 17, 2022

Related U.S. Application Data

(63) Continuation of application No. PCT/EP2020/062766, filed on May 7, 2020.

(30) Foreign Application Priority Data

May 27, 2019  (EP) .................................... 19176829

(51) Int. Cl.
*B60L 53/18* (2019.01)
*B60L 53/16* (2019.01)
(Continued)

(52) U.S. Cl.
CPC .............. *B60L 53/18* (2019.02); *B60L 53/16* (2019.02); *B60L 53/66* (2019.02); *H01B 9/003* (2013.01);
(Continued)

(58) Field of Classification Search
CPC .......... B60L 53/18; B60L 53/16; B60L 53/66; Y02T 10/70; Y02T 10/7072; Y02T 90/12; Y02T 90/14; Y02T 90/16; H01B 9/003
(Continued)

(56) References Cited

U.S. PATENT DOCUMENTS 6,470,401 B1 * 10/2002 Peterson ................. H04L 12/10
710/33
6,526,581 B1 * 2/2003 Edson .................... H04N 5/765
725/111
(Continued)

FOREIGN PATENT DOCUMENTS

CN   104221228 A   12/2014
CN   106427638 A   2/2017
(Continued)

OTHER PUBLICATIONS

"Why are the wires inside an ethernet cable twisted in pairs? What discipline does the science of data transfer specifically over wires fall under?", Robbak&Aanar, Reddit.com, published Oct. 2017, accessed Online Feb. 2025, https:www.reddit.com/r/askscience/comments/78n4uf/why_are_the_wires_inside_an_ethernet_cable/.*
(Continued)

*Primary Examiner* — John T Trischler
(74) *Attorney, Agent, or Firm* — McCarter & English, LLP

(57)                      ABSTRACT

An electric vehicle supply equipment includes a charger configured for supplying a charging current for charging an electrical vehicle, a charging connector configured for connecting to the electrical vehicle and a charging cable connected with one end to the charger and with another end to the charging connector and configured for transmitting the charging current between the charging connector and the charger. The charging cable includes at least one twisted-
(Continued)

pair cable extending between the charging connector and the charger, and the charging connector includes a power-line communicator configured for communicating with the electrical vehicle via the charging connector and with the charger via Ethernet over the at least one twisted-pair cable.

17 Claims, 2 Drawing Sheets

(51) Int. Cl.

| | |
|---|---|
| *B60L 53/30* | (2019.01) |
| *B60L 53/66* | (2019.01) |
| *H01B 9/00* | (2006.01) |
| *H01B 11/02* | (2006.01) |
| *H01B 7/08* | (2006.01) |
| *H04B 3/54* | (2006.01) |

(52) U.S. Cl.
CPC ........... *B60L 53/305* (2019.02); *B60L 53/665* (2019.02); *H01B 7/0876* (2013.01); *H01B 11/02* (2013.01); *H04B 3/54* (2013.01); *H04B 3/548* (2013.01); *Y02T 90/16* (2013.01); *Y02T 90/167* (2013.01)

(58) Field of Classification Search
USPC ........................................................ 320/109
See application file for complete search history.

(56) References Cited

U.S. PATENT DOCUMENTS

| | | | | |
|---|---|---|---|---|
| 7,483,797 | B2 * | 1/2009 | Nambu | H02J 13/00001 702/60 |
| 7,500,118 | B2 * | 3/2009 | Crawley | H04L 12/12 713/300 |
| 7,560,825 | B2 * | 7/2009 | Crawley | H04L 12/10 713/300 |
| 7,778,152 | B2 * | 8/2010 | Chan | H04B 3/56 370/208 |
| 7,964,993 | B2 * | 6/2011 | Cai | H04L 25/0298 379/322 |
| 8,310,205 | B1 * | 11/2012 | Hamburgen | H02J 7/92 324/426 |
| 8,472,351 | B2 * | 6/2013 | Bar-Niv | H04L 12/2838 370/257 |
| 8,614,673 | B2 * | 12/2013 | Binder | G01S 3/7864 345/158 |
| 8,614,674 | B2 * | 12/2013 | Binder | G09G 5/10 345/158 |
| 8,717,170 | B1 * | 5/2014 | Juhasz | B60L 53/63 340/5.2 |
| 8,781,809 | B2 * | 7/2014 | Bridges | B60L 53/63 703/2 |
| 8,796,881 | B2 * | 8/2014 | Davis | H02J 3/381 307/69 |
| 8,830,039 | B1 * | 9/2014 | Egan | B60L 53/65 320/109 |
| 8,981,787 | B2 * | 3/2015 | Scheu | B60L 58/00 701/1 |
| 9,013,206 | B2 * | 4/2015 | Muller | B60L 53/65 324/764.01 |
| 9,166,860 | B2 * | 10/2015 | Kim | H04L 65/00 |
| 9,283,862 | B2 * | 3/2016 | Bridges | H02J 3/381 |
| 9,413,171 | B2 * | 8/2016 | Neyhart | H04W 76/20 |
| 9,431,831 | B1 * | 8/2016 | Richardson | G06F 1/263 |
| 9,531,131 | B2 * | 12/2016 | Takata | H01R 13/648 |
| 9,545,851 | B2 * | 1/2017 | Manotas, Jr. | B60L 53/65 |
| 9,630,513 | B2 * | 4/2017 | Fietzek | B60L 55/00 |
| 9,712,337 | B2 * | 7/2017 | Greenwalt | G06F 1/3278 |
| 9,731,611 | B2 * | 8/2017 | Kojima | B60L 3/0069 |
| 9,780,499 | B2 * | 10/2017 | Takata | B60L 53/65 |
| 9,783,071 | B2 * | 10/2017 | Gaul | B60L 53/14 |

| | | | | |
|---|---|---|---|---|
| 9,851,411 | B2 * | 12/2017 | Champlin | G01R 31/389 |
| 9,925,881 | B2 * | 3/2018 | Manotas, Jr. | B60L 53/14 |
| 10,050,444 | B2 * | 8/2018 | Neyhart | G05B 15/02 |
| 10,217,359 | B2 * | 2/2019 | Singh | G06V 20/40 |
| 10,249,410 | B1 * | 4/2019 | Lanoe | H01B 11/06 |
| 10,276,280 | B1 * | 4/2019 | Lewis, Sr. | H04L 12/10 |
| 10,333,322 | B2 * | 6/2019 | Arends | H02J 7/0068 |
| 10,333,323 | B2 * | 6/2019 | Arends | H02J 7/0045 |
| 10,374,813 | B2 * | 8/2019 | Sheffield | H04L 41/0659 |
| 10,404,086 | B2 * | 9/2019 | Wu | H02J 7/02 |
| 10,421,365 | B2 * | 9/2019 | Zech | H01R 31/065 |
| 10,466,277 | B1 * | 11/2019 | Brooks | G01R 19/0092 |
| 10,547,566 | B2 * | 1/2020 | Smart | H04L 12/40195 |
| 10,569,658 | B2 * | 2/2020 | Manotas, Jr. | B60L 53/665 |
| 10,582,144 | B2 * | 3/2020 | Binder | G06F 3/012 |
| 10,672,537 | B2 * | 6/2020 | Goergen | H01B 9/005 |
| 10,673,640 | B2 * | 6/2020 | Rohrbacher | H04L 12/2803 |
| 10,732,212 | B2 * | 8/2020 | Brown | G01R 27/28 |
| 10,742,032 | B2 * | 8/2020 | Neyhart | H04L 12/2823 |
| 10,875,406 | B2 * | 12/2020 | Galin | B60L 53/57 |
| 11,046,195 | B2 * | 6/2021 | Wischnack | B60L 53/14 |
| 11,121,560 | B2 * | 9/2021 | Singhal | H02J 7/342 |
| 11,148,540 | B2 * | 10/2021 | Koolen | B60L 58/12 |
| 11,201,442 | B2 * | 12/2021 | Deng | H01R 24/40 |
| 11,225,156 | B2 * | 1/2022 | Miller | B60L 53/14 |
| 11,226,239 | B2 * | 1/2022 | Zoon | B60L 53/18 |
| 11,251,621 | B1 * | 2/2022 | Hume | H02J 7/35 |
| 11,285,824 | B2 * | 3/2022 | Galin | H02J 3/14 |
| 11,285,834 | B2 * | 3/2022 | Kwon | B60L 53/60 |
| 11,328,839 | B1 * | 5/2022 | Kummer | H01B 9/003 |
| 11,351,877 | B2 * | 6/2022 | Koolen | B60L 53/18 |
| 11,390,177 | B2 * | 7/2022 | Noh | B60L 53/60 |
| 11,400,821 | B2 * | 8/2022 | Galin | B60L 53/57 |
| 11,521,482 | B2 * | 12/2022 | Neyhart | G05B 15/02 |
| 11,540,354 | B2 * | 12/2022 | Saldin | H04L 45/28 |
| 11,554,685 | B2 * | 1/2023 | Dunjic | G06Q 20/3825 |
| 11,628,734 | B2 * | 4/2023 | Margosian | B60L 53/16 320/109 |
| 11,745,613 | B2 * | 9/2023 | Goergen | G06F 21/44 320/109 |
| 11,756,705 | B1 * | 9/2023 | Kummer | H01B 9/003 315/181 |
| 11,784,871 | B2 * | 10/2023 | Yasunori | H04B 7/14 370/221 |
| 11,862,364 | B2 * | 1/2024 | Kummer | H05B 45/10 |
| 11,932,134 | B2 * | 3/2024 | Dunjic | G07F 15/005 |
| 11,933,862 | B2 * | 3/2024 | Koolen | H02H 11/001 |
| 11,950,325 | B2 * | 4/2024 | Saldin | H04W 88/16 |
| 12,040,907 | B2 * | 7/2024 | Raaijmakers | B60L 53/18 |
| 12,057,662 | B2 * | 8/2024 | Van der Heijden | H01R 13/7135 |
| 12,083,907 | B2 * | 9/2024 | Bech | B60L 3/04 |
| 12,083,911 | B2 * | 9/2024 | Logakis | H01B 7/425 |
| 12,184,159 | B2 * | 12/2024 | Hume | H02M 1/007 |
| 12,214,683 | B2 * | 2/2025 | Galin | B60L 55/00 |
| 12,412,467 | B2 * | 9/2025 | Neyhart | H04L 12/2807 |
| 2003/0101459 | A1 * | 5/2003 | Edson | H04N 5/765 725/78 |
| 2006/0238252 | A1 * | 10/2006 | Crawley | H04L 25/0266 330/253 |
| 2007/0236853 | A1 * | 10/2007 | Crawley | H04L 12/10 361/119 |
| 2008/0136256 | A1 * | 6/2008 | Gattani | H04L 12/66 307/2 |
| 2008/0137759 | A1 * | 6/2008 | Cai | H04L 25/08 370/216 |
| 2008/0154387 | A1 | 6/2008 | Nambu | |
| 2009/0207924 | A1 * | 8/2009 | Chan | H04B 3/54 439/296 |
| 2010/0186234 | A1 * | 7/2010 | Binder | H04N 23/55 348/E5.022 |
| 2010/0295782 | A1 * | 11/2010 | Binder | H04M 3/02 348/222.1 |
| 2011/0001356 | A1 * | 1/2011 | Pollack | H02J 7/00 307/31 |
| 2011/0004358 | A1 * | 1/2011 | Pollack | B60L 53/65 700/297 |

(56) References Cited

U.S. PATENT DOCUMENTS

| | | | | |
|---|---|---|---|---|
| 2011/0004406 A1* | 1/2011 | Davis | B60L 53/18 | 701/300 |
| 2011/0007824 A1* | 1/2011 | Bridges | B60L 53/64 | 375/257 |
| 2011/0010043 A1* | 1/2011 | Lafky | B60L 53/63 | 320/109 |
| 2011/0010158 A1* | 1/2011 | Bridges | H02J 3/381 | 702/62 |
| 2011/0096793 A1* | 4/2011 | Bar-Niv | H04L 12/66 | 370/463 |
| 2011/0204851 A1* | 8/2011 | Manotas, Jr. | B60L 55/00 | 320/128 |
| 2012/0029728 A1* | 2/2012 | Hirayama | B60L 53/66 | 701/1 |
| 2012/0140371 A1* | 6/2012 | Gaul | B60L 53/14 | 361/93.6 |
| 2012/0221703 A1* | 8/2012 | Schwager | B60L 53/14 | 709/223 |
| 2012/0235901 A1* | 9/2012 | Binder | H04N 5/645 | 382/103 |
| 2012/0249768 A1* | 10/2012 | Binder | G06V 40/161 | 348/E7.085 |
| 2012/0265362 A1* | 10/2012 | Yasko | B60L 53/66 | 320/155 |
| 2013/0044198 A1* | 2/2013 | Binder | H04N 7/015 | 348/E7.085 |
| 2013/0094517 A1* | 4/2013 | Kim | H04B 3/542 | 370/474 |
| 2013/0154667 A1* | 6/2013 | Scheu | B60L 3/00 | 324/617 |
| 2013/0217409 A1* | 8/2013 | Bridges | B60L 53/64 | 455/456.1 |
| 2013/0235179 A1* | 9/2013 | Binder | G06F 3/005 | 455/556.1 |
| 2013/0258113 A1* | 10/2013 | Binder | G01S 3/7864 | 348/169 |
| 2013/0278225 A1* | 10/2013 | Dietze | B60L 53/14 | 320/137 |
| 2013/0307466 A1* | 11/2013 | Frisch | B60L 53/67 | 320/106 |
| 2013/0321024 A1* | 12/2013 | Muller | B60L 53/52 | 324/764.01 |
| 2014/0002094 A1* | 1/2014 | Champlin | G01R 31/389 | 324/426 |
| 2014/0111165 A9* | 4/2014 | Dietze | B60L 53/14 | 320/137 |
| 2014/0125485 A1* | 5/2014 | Juhasz | B60L 53/65 | 340/540 |
| 2014/0177469 A1* | 6/2014 | Neyhart | H04L 12/2807 | 370/254 |
| 2014/0258738 A1* | 9/2014 | Greenwalt | G06F 1/3206 | 713/300 |
| 2014/0333262 A1* | 11/2014 | Ochiai | B60L 53/62 | 320/109 |
| 2015/0011123 A1* | 1/2015 | Takata | B60L 58/12 | 439/620.01 |
| 2015/0015203 A1* | 1/2015 | Takata | H02J 7/0042 | 320/109 |
| 2015/0076901 A1* | 3/2015 | Panguluri | B60R 16/03 | 307/10.1 |
| 2015/0202976 A1* | 7/2015 | Bridges | B60L 53/63 | 320/109 |
| 2015/0258902 A1* | 9/2015 | Fietzek | B60L 55/00 | 307/9.1 |
| 2016/0134834 A1* | 5/2016 | Binder | G06F 3/012 | 348/222.1 |
| 2016/0139663 A1* | 5/2016 | Binder | G06V 10/242 | 345/156 |
| 2016/0149411 A1* | 5/2016 | Neyhart | G05B 15/02 | 700/295 |
| 2016/0221453 A1* | 8/2016 | Bridges | B60L 53/305 | |
| 2016/0250939 A1* | 9/2016 | Shin | B60L 53/305 | 320/109 |
| 2016/0285282 A1* | 9/2016 | Arends | H02J 7/0068 | |
| 2016/0285289 A1* | 9/2016 | Arends | H02J 7/342 | |
| 2016/0308683 A1* | 10/2016 | Pischl | H04L 12/10 | |
| 2016/0328605 A1* | 11/2016 | Binder | H04N 7/163 | |
| 2016/0330395 A1* | 11/2016 | Binder | H04W 88/02 | |
| 2016/0330505 A1* | 11/2016 | Binder | G01S 3/7864 | |
| 2016/0368391 A1* | 12/2016 | Kojima | B60L 53/16 | |
| 2017/0040968 A1* | 2/2017 | Igarashi | H03H 7/06 | |
| 2017/0041152 A1* | 2/2017 | Sheffield | H04L 12/10 | |
| 2017/0057369 A1* | 3/2017 | Næsje | B60L 53/66 | |
| 2017/0080811 A1* | 3/2017 | Manotas, Jr. | B60L 53/22 | |
| 2017/0166073 A1* | 6/2017 | Park | H02J 7/00306 | |
| 2017/0250550 A1* | 8/2017 | Miftakhov | H02J 3/003 | |
| 2017/0368953 A1* | 12/2017 | Zech | B60L 53/16 | |
| 2018/0013303 A1* | 1/2018 | Wu | H02J 7/02 | |
| 2018/0091191 A1* | 3/2018 | Berger | B60L 53/68 | |
| 2018/0114437 A1* | 4/2018 | Singh | G08G 1/015 | |
| 2018/0178661 A1* | 6/2018 | Manotas, Jr. | B60L 53/305 | |
| 2018/0201142 A1 | 7/2018 | Galin et al. | | |
| 2018/0281607 A1* | 10/2018 | Galin | H02J 3/38 | |
| 2018/0334047 A1* | 11/2018 | Wischnack | B60L 53/66 | |
| 2018/0345509 A1* | 12/2018 | Binder | H04L 5/14 | |
| 2019/0006846 A1* | 1/2019 | Neyhart | H04W 76/20 | |
| 2019/0030983 A1* | 1/2019 | Miller | H02J 7/00309 | |
| 2019/0036715 A1* | 1/2019 | Rohrbacher | H04L 12/10 | |
| 2019/0061535 A1* | 2/2019 | Bridges | H02J 3/381 | |
| 2019/0074698 A1* | 3/2019 | Singhal | H02J 7/342 | |
| 2019/0104085 A1* | 4/2019 | Smart | H04L 49/15 | |
| 2019/0128936 A1* | 5/2019 | Brown | G01R 31/002 | |
| 2019/0190217 A1* | 6/2019 | Deng | H01R 24/40 | |
| 2019/0304630 A1* | 10/2019 | Goergen | H04L 12/40045 | |
| 2019/0360873 A1* | 11/2019 | Zoon | H01R 13/6683 | |
| 2019/0381907 A1* | 12/2019 | Koolen | B60L 58/12 | |
| 2020/0035382 A1* | 1/2020 | Sato | B60L 53/18 | |
| 2020/0079238 A1* | 3/2020 | Kwon | H04B 3/544 | |
| 2020/0122593 A1* | 4/2020 | Noh | B60L 53/60 | |
| 2020/0186740 A1* | 6/2020 | Binder | H04N 19/70 | |
| 2020/0380477 A1* | 12/2020 | Dunjic | B60L 53/665 | |
| 2021/0044113 A1* | 2/2021 | Neyhart | H04W 76/20 | |
| 2021/0048485 A1* | 2/2021 | Koolen | B60L 3/0069 | |
| 2021/0070184 A1* | 3/2021 | Koolen | B60L 53/18 | |
| 2021/0094427 A1* | 4/2021 | Galin | H02J 3/388 | |
| 2021/0100069 A1* | 4/2021 | Saldin | H04W 88/16 | |
| 2021/0385095 A1* | 12/2021 | Raaijmakers | B60L 53/66 | |
| 2021/0387537 A1* | 12/2021 | Bech | B60L 53/16 | |
| 2021/0391672 A1* | 12/2021 | Van der Heijden | H01R 13/652 | |
| 2021/0399942 A1* | 12/2021 | Yasunori | B60R 16/0232 | |
| 2022/0063429 A1* | 3/2022 | Goergen | H02J 7/00045 | |
| 2022/0084722 A1* | 3/2022 | Kummer | H02G 1/00 | |
| 2022/0089052 A1* | 3/2022 | Margosian | B60L 53/66 | |
| 2022/0144111 A1* | 5/2022 | Logakis | B60L 53/18 | |
| 2022/0169131 A1* | 6/2022 | Galin | B60L 55/00 | |
| 2022/0231514 A1* | 7/2022 | Hume | H02J 3/381 | |
| 2022/0258628 A1* | 8/2022 | Raaijmakers | B60L 53/11 | |
| 2022/0332201 A1* | 10/2022 | Khamashta | B60L 53/62 | |
| 2022/0415097 A1* | 12/2022 | Kodama | H04L 67/12 | |
| 2023/0059240 A1* | 2/2023 | Koolen | B60L 53/305 | |
| 2023/0061714 A1* | 3/2023 | Bech | B60L 53/14 | |
| 2023/0084594 A1* | 3/2023 | Saldin | H04L 45/22 | 370/401 |
| 2023/0096878 A1* | 3/2023 | Thomason | B60L 53/18 | 320/109 |
| 2023/0105057 A1* | 4/2023 | Neyhart | H04W 76/20 | 370/254 |
| 2023/0113732 A1* | 4/2023 | Dunjic | B60L 53/305 | 705/13 |
| 2023/0138878 A1* | 5/2023 | Shin | B60L 3/0069 | 320/109 |
| 2023/0178927 A1* | 6/2023 | García-Ferré | H01R 13/504 | 320/109 |
| 2023/0182592 A1* | 6/2023 | Garcia-Ferre | B60L 53/16 | 439/296 |
| 2023/0311685 A1* | 10/2023 | Goergen | B60L 53/16 | 320/109 |
| 2023/0361590 A1* | 11/2023 | Lacaux | H02J 7/007182 | |
| 2024/0075829 A1* | 3/2024 | Rowland | H01R 13/005 | |

(56) References Cited

U.S. PATENT DOCUMENTS

| | | | |
|---|---|---|---|
| 2024/0181913 A1* | 6/2024 | Rodríguez Escudé . | B60L 53/16 |
| 2024/0260138 A1* | 8/2024 | Saldin ................... | H04L 45/22 |
| 2024/0308363 A1* | 9/2024 | Khamashta ........... | B60L 53/14 |
| 2025/0033496 A1* | 1/2025 | Rowland ................ | B60L 53/36 |
| 2025/0033497 A1* | 1/2025 | Rowland ................ | B60L 58/26 |
| 2025/0042293 A1* | 2/2025 | Cheung ................. | B60L 53/63 |
| 2025/0050776 A1* | 2/2025 | Alokozai .............. | B60L 53/66 |
| 2025/0166494 A1* | 5/2025 | Neyhart ............... | H04W 76/20 |

FOREIGN PATENT DOCUMENTS

| | | | | |
|---|---|---|---|---|
| DE | 102013212219 A1 | 12/2014 | | |
| JP | 2015-207817 A | 11/2015 | | |
| JP | 6201071 B1 | 9/2017 | | |
| WO | WO-2010031691 A1 * | 3/2010 | ............. | B60L 53/65 |
| WO | WO 2012/055295 A1 | 5/2012 | | |

OTHER PUBLICATIONS

Gao et al., "Design of Electric Vehicle Charging Station Monitoring System," *Computer Measurement & Control*, 25(11): 8 pp. (2017).
The Patent Office of the People's Republic of China, Office Action in Chinese Patent Application No. 202080039638.X, 9 pp. (Aug. 7, 2023).

* cited by examiner

ELECTRIC VEHICLE SUPPLY EQUIPMENT FOR CHARGING AN ELECTRICAL VEHICLE

CROSS-REFERENCE TO PRIOR APPLICATIONS

This application is a continuation of International Patent Application No. PCT/EP2020/062766, filed on May 7, 2020, which claims priority to European Patent Application No. EP 19176829.0, filed on May 27, 2019. The entire disclosure of both applications is hereby incorporated by reference herein.

FIELD

One or more embodiments of the present invention may relate to an electric vehicle supply equipment comprising a charger configured for supplying a charging current for charging an electrical vehicle, a charging connector configured for connecting to the electrical vehicle and a charging cable connected with one end to the charger and with another end to the charging connector and configured for transmitting the charging current between the charging connector and the charger.

BACKGROUND

Electric vehicle supply equipment, EVSE, also referred to as an electric vehicle, EV, charging station, electric recharging point, charging point, charge point or electronic charging station, ECS, is an element in an infrastructure that supplies electric energy for recharging of electric vehicles, including electric cars, neighbourhood electric vehicles and plug-in hybrids. EVSEs provide a range of heavy duty or special connectors that conform to the variety of standards. For common rapid charging and direct current, DC, the Combined Charging System, CCS, is becoming the universal standard. Other connector charging standards include CHAdeMO and Type 2 connectors.

Generally, the need for EVSEs is growing and the variety of use cases are getting more and more complex. While EVSEs were originally designed and used for charging electric vehicles such as cars, the focus has now gotten much wider. In recent days, trucks, busses, ships, trains and/or planes are requesting electrical charging. With today's EVSEs, communication from a charger of the EVSE supplying the charging current and the electrical vehicle charged with the charged current is carried out with power-line communication standards. By means of such power-line communication, PLC, standard signals are modulated onto conductors integrated in a charging cable connecting the charger and the electrical vehicle. Today's PLCS standards limit the charging cable length to 10 meters (m) for avoiding electromagnetic interference, EMI, issues, crosstalk between different chargers or between multiple outlets in the charger. Thus, the charging cable becomes crucial and the bottleneck building up a charging session with trucks, busses, ships, trains and/or planes often requiring charging cable lengths of 10 or more meters.

SUMMARY

One or more embodiments of the present invention may provide a electric vehicle supply equipment (EVSE) comprising: a charger configured for supplying a charging current for charging an electrical vehicle; a charging connector configured for connecting to the electrical vehicle; and a charging cable connected with a first end to the charger and with a second end to the charging connector and configured for transmitting the charging current between the charging connector and the charger, wherein: the charging cable comprises at least one twisted-pair cable extending between the charging connector and the charger, and the charging connector comprises a power-line communicator configured for communicating with the electrical vehicle via the charging connector and with the charger via Ethernet over the at least one twisted-pair cable.

An object of one or more embodiments of the invention may be to provide an electrical vehicle supply equipment that allows operating charging cables with lengths of more than 10 meters, whereby communications between the electrical vehicle supply equipment and an electrical vehicle are not deteriorated by electromagnetic interference, EMI, issues and/or crosstalk between different chargers or between multiple outlets in the charger.

BRIEF DESCRIPTION OF THE DRAWINGS

One or more embodiments of the present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
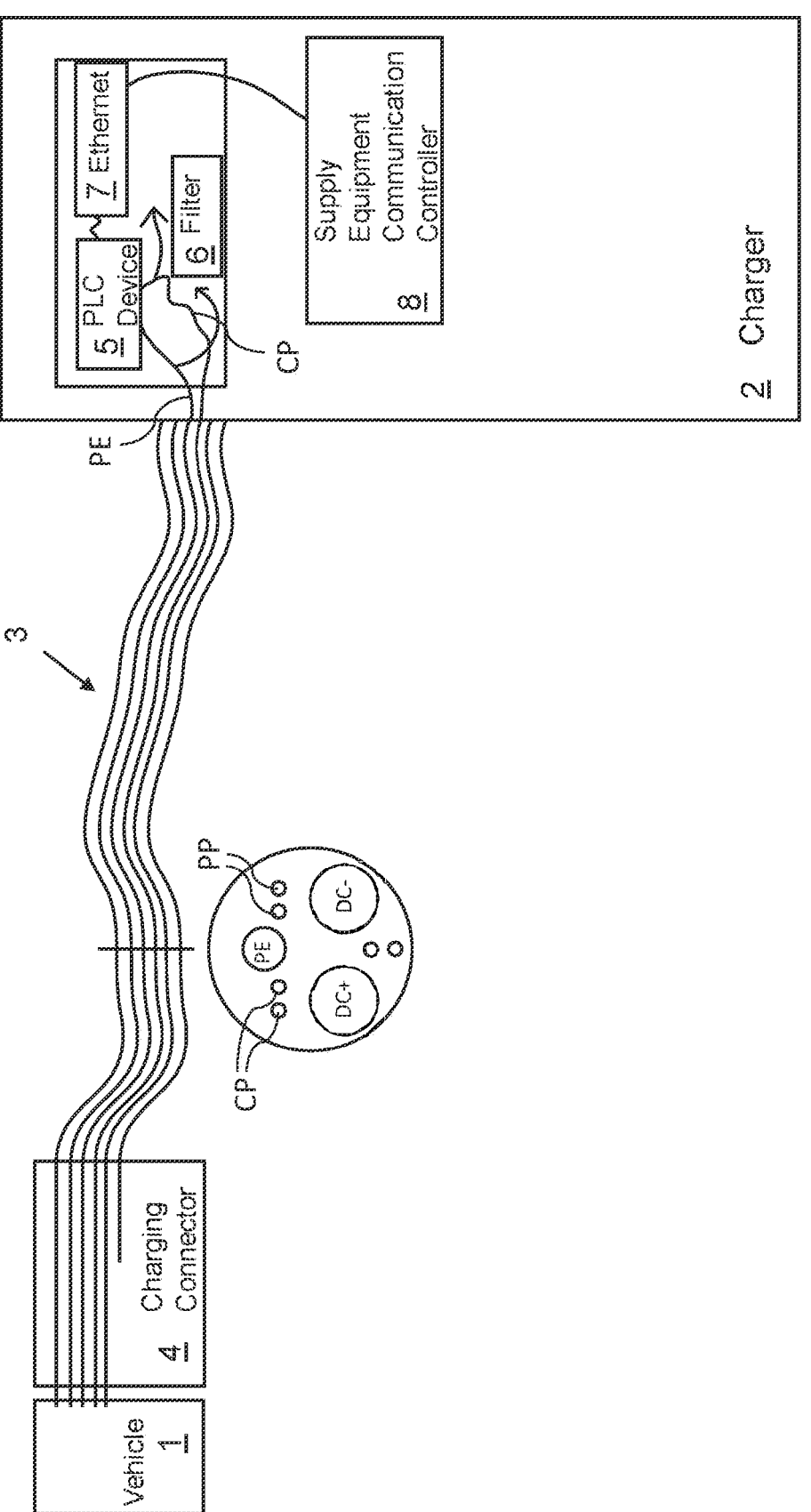
FIG. 1 shows an electric vehicle supply equipment for charging an electrical vehicle as known from prior art in a schematic view.

An object of one or more embodiments of the invention may be solved by the features of the independent claim. Preferred embodiments are detailed in the dependent claims.

Thus, the object may be solved by an electrical vehicle supply equipment comprising a charger configured for supplying a charging current for charging an electrical vehicle, a charging connector configured for connecting to the electrical vehicle and a charging cable connected with one end to the charger and with another end to the charging connector and configured for transmitting the charging current between the charging connector and the charger, wherein:

the charging cable comprises at least one twisted-pair cable extending between the charging connector and the charger, and the charging connector comprises a power-line communicator configured for communicating with the electrical vehicle via the charging connector and with the charger via Ethernet over the at least one twisted-pair cable.

A key point of the invention may be that the power-line communication, PLC, device is provided at the charging connector, preferably in and/or within the charging connector. In such a way, PLC communication can be established between the charging connector and the electrical vehicle, for example via a control pilot conductor of the charging connector connecting to the electrical vehicle. Compared to the length of a typical charging cable of a prior art EVSE, for example 2 to 10 meters, the distance between the charging connector and the electrical vehicle is shorter than the distance between the charger and the electrical vehicle. Thus, in any case the distance between the charging connector and the electrical vehicle does not exceed 10 meters, as for example defined by the DIN SPEC 70121 and/or ISO/IEC 15118 standard for power-line communications as maximum distance. In contrast to the prior art, PLC would not be used anymore for the communication between the charging connector and the charger. Instead, the communication between the charging connector and the charger may be carried out by Ethernet over twisted-pair. As many charging cables are already provided with additional and so far unused wires, the proposed solution may be easily implemented with existing charging cables, may be with some minor modifications, by using the so far unused wires for Ethernet communication between the charging connector and the charger.

In such a way, the proposed electrical vehicle supply equipment, EVSE, may enable charging cables having a length of far more than 10 meters to be used for charging, without risking that communication between the charger and electrical vehicle is deteriorated by electromagnetic interference, EMI, electromagnetic compatibility, EMC, issues and/or crosstalk between different chargers or between multiple outlets in the charger. Charging applications such as charging trucks, busses, ships, trains and/or planes can be easily implemented with the proposed solution. Ethernet is known as robust and suitable for longer distances, and thus guarantees reliable communication between the charging connector and the charger. Further, protecting the charging connector against EMI and EMC noise may be much easier than protecting the charging cable, leading to a less expensive implementation. Besides that, as the coupling takes place in the charging connector, the PLC distance between the charging connector and the electrical vehicle is constant and independent from charging cable length. As a consequence, manufacturing become simpler as a manufacturer needs only one calibration for a charging connector type regardless of the applied cable length.

In other words, in prior art installations control pilot lines provided in the charging cable and used for communications between the electrical vehicle and the charger may pick up EMI or EMC noise affecting the charging cable and/or the charger depending on routing. The same charging cable with a different routing in the charger can thus result in a different signal quality. Also, today's PLC standards limit the charging cable length to 10 meters for guaranteeing sufficient and reliable signal quality. With the proposed solution arranging the PLC device outside the charger and within the charging connector, problems of EMI and EMC noise collected due to longer and differently routed PLC control pilot lines are eliminated. As a positive side effect, the possible charging cable length may be extended beyond 10 meters, for example towards 100 meters. Thus, by basically inserting the PLC device into the charging connector, the charging cable length will not affect the PLC signal quality even if the charging cable is used in different charger designs.

Twisted pair cabling is a type of wiring in which two conductors of a single circuit are twisted together for the purposes of improving electromagnetic compatibility. Compared to a single conductor or an untwisted balanced pair, a twisted pair reduces electromagnetic radiation from the pair and crosstalk between neighbouring pairs and improves rejection of external electromagnetic interference. For the present application the term twisted pair should be broadly interpreted such that the wires do not mandatorily have to be twisted across their full length or do not need to be not twisted at all. The power-line communication device is preferably provided according to DIN 70121 and/or ISO/IEC 15118 standards. For DC charging DIN 70121 supports charging powers up to 80 kW, whereas for higher powers communication ISO/IEC 15118 is preferred. Preferably the PLC device is provided as a so called green PHY modem.

According to a preferred implementation, the power-line communication device may be arranged within the charging connector and/or the charging connector comprises an enclosure and the power-line communication device is arranged within the enclosure. Preferably the PLC device may be completely integrated and/or encased by the charging connector. The PLC device may be preferably connected to a control pilot conductor and a protective earth conductor of the charging cable and/or of the charging connector for modulating PLC signals onto the control pilot conductor. The charging cable may comprise additional conductors for supplying the PLC device with electrical energy.

In another preferred implementation the charging cable may comprise a length between its one end and it's another end of greater than 10 meter, great than or equal to 15 meter, great than or equal to 30 meter, great than or equal to 40 meter, or great than or equal to 100 meter. With such charging cable lengths trucks, busses, ships, trains and/or planes can be charged with electrical energy, while PLC communication between trucks, busses, ships, trains and/or planes and the charger is not negatively affected by EMI or EMC noise.

According to a further preferred implementation, the charging connector may comprise a low-pass filter configured for filtering out power-line communication signals between the charging connector and the charging cable. The low-pass filter may preferably be provided within the charging connector and/or completely encased by an enclosure and/or casing of the charging connector. Alternatively, or in addition, the low-pass filter can be provided integrated with the PLC device. The low-pass filter may be preferably connected to a control pilot conductor and a protective earth conductor of the charging connector and/or of the charging cable. Low-pass filtering control pilot signals in the charging connector allows to block high level communication PLC signals normally leaving the charging connector towards the charging cable and charger, and as result only letting low level communication reach a protocol interface of the charger, thereby achieving better EMC and EMI performance, for example, against crosstalk between chargers and electrical vehicles. In such a way, PLC signals may be blocked from entering the charging cable and/or the charger.

In another preferred implementation, the power-line communication device may be provided as a Power-over-Ethernet, PoE, device. Such implementation is in particular advantageous as otherwise necessary conductors for providing electrical energy for the power-line communication device can be omitted as said electrical energy is provided via Power-over-Ethernet. In parallel, the charger may be preferably configured for providing Power-over-Ethernet via the Ethernet over twisted-pair cable. Preferably the power-line communication device may be provided as per IEEE 802.3 or any of its successor standards.

According to a further preferred implementation, the power-line communication device may be configured for communicating with the charger according to a 1000BASE-T1 or a 100BASE-T1 standard. 1000BASE-T1, preferably as per 802.3 bp-2016 standard, allows transmission of 1000 Mbps over a single pair of twisted-pair cable over a distance of maximum 40 meters charging cable length. 100BASE-T1, preferably as per 802.3bw-2015 (CL96) standard, allows transmission of 100 Mbps over a single pair of twisted-pair cable over a distance of maximum 15 meters charging cable length. Both standards are designated for automotive, Internet of Things (IoT) or M2M applications such as charging electrical vehicles. Planned standards that require only a single twisted-pair cable are 10BASE-T1S and 10BASE-T1L as per 802.3cg-2019 standard allowing 10 Mbps over a maximum distance of 15 meters respectively 1000 meters. Besides that, other standards can be used for Ethernet over twisted-pair that require two of four twisted-pair cables, for example 100BASE-TX, 1000BASE-T1, 2.5GBASE-T, 5GBASE-T or 10GBASE-T with respective maximum charging cable lengths of 15 meters to 100 meters.

In another preferred implementation, the charging connector may comprise a shielding configured for protecting the power-line communication device against electromagnetic compatibility, EMC, noise. The shielding may comprise a metal and of any other suitable material for shielding EMC and EMI noise.

According to a further preferred implementation, the charging cable may comprise one, two or four twisted-pair cables. As outlined before, with a single twisted-pair cable 1000BASE-T1 or 100BASE-T1 standard can be used. 100BASE-TX requires two twisted-pair cables, whereas 1000BASE-T1, 2.5GBASE-T, 5GBASE-T and 10GBASE-T each require four twisted-pair cables, whereas the latter standards allow a data transmission rate of 2,500 Mbps, 5,000 Mbps, and 10,000 Mbps, respectively.

In another preferred implementation, the charger may comprise a supply equipment communication controller, SECC, connected to the at least one twisted-pair cable and to an EVSE local area network, LAN, and/or the Internet. The supply equipment communication controller may be preferably provided as per ISO 15118 standard, in particular as per ISO 15118-3. ISO 15118 standard defines communication of electric vehicles with electric vehicle supply equipment and specifies in particular high-level messages that control charging in both AC and DC mode and the corresponding requirements.

According to a further preferred implementation, the charging cable may comprise a control pilot conductor, CP, extending between the charging connector and the charger and configured for submitting a control pilot signal, a protective earth conductor, PE, extending between the charging connector and the charger, a positive DC conductor, DC+, extending between the charging connector and the charger and/or a negative DC conductor, DC−, extending between the charging connector and the charger. As charge currents increase, the charging cable can be liquid cooled, as high-power charging requires DC+ and DC-conductors which can carry 500 amperes (A) current at a voltage of 1000 volts (V), or even more. The liquid cooling allows the DC+ and DC− conductors within the charging cable to become thinner, and thereby easier to use, because excessive heat due to high charge currents and charging cable internal resistances are taken care of. The charging cable may further comprise a proximity pilot conductor, PP, for submitting a proximity pilot signal. Control pilot signal and/or proximity pilot signal may be preferably signalled as per SAE J1772 and/or IEC 61851 standard.

In another preferred implementation, at least the charging connector is provided according to a Combined Charging System, CCS, standard.

Electric vehicle direct current fast charging systems and methods often use a so-called Combined Charging System, CCS, protocol according to IEC 61851-23 and SAE J1772 standard for charging electrical vehicles both in the US and in the European Union, EU. The Combined Charging System, CCS, protocol is a fast charging method for charging electric vehicles delivering high-voltage direct current via a charging connector derived from SAE J1772 standard (IEC Type 1) or IEC Type 2 connector. Automobile manufactures that support CCS include Jaguar, Volkswagen, General Motors, BMW, Daimler, Ford, FCA, Tesla and Hyundai. The CSS standard is controlled by the so called CharIN consortium. Besides other protocols such as, for example, CHAdeMO, an abbreviation of CHArge de Move, or GB/T, in particular according to 20234.3-2011 standard, can be used in connection with the proposed solution. According to a further preferred implementation, the at least one twisted-pair cable is integrated within the charging cable.

FIG. 1 shows an electric vehicle supply equipment for charging an electrical vehicle 1 as known from prior art. The electric vehicle supply equipment comprises a charger 2 configured for supplying a charging current. The charger 2 is connected via a transformer and converter to an AC grid. A charging cable 3 is connected with one end to the charger 2 and with its opposite end to charging connector 4, which is plugged into a respective charging socket of the electrical vehicle 1 for charging the electrical vehicle with electrical energy.

The charging cable 3 comprises, as can be seen from the sectional view of the charging cable 3 in FIG. 1 as well as indicated by different wires, a positive DC conductor DC+ and a negative DC conductor DC−, each extending between the charging connector 4 and the charger 2 for submitting the charging current. The charging cable 3 further comprises a protective earth conductor PE, control pilot conductors CP as well as further wires for submitting sensor signals PP.

The charger 2 comprises a power-line communication device 5, which is connected to the control pilot conductors CP as well as to the protective earth conductor PE. Connected to the power-line communication device 5 is a low-pass filter 6 on the control pilot conductor CP side for processing low level signalling. In such a way, the control pilot conductors CP, or only one control pilot conductors CP, and the protective earth conductor PE form a transmission line between the electrical vehicle 1 and the charger 2 by adding a modulated carrier signal to the wiring respectively to the control pilot conductors CP. The power-line communication device 5 is further connected with an Ethernet port to an Ethernet switch/router 7, which connects via a supply equipment communication controller 8 to an EVSE Local Area Network, LAN and/or the Internet. The power-line communication device 5, the low-pass filter 6, the Ethernet switch/router 7 and the supply equipment communication controller 8 are provided within an enclosure of the charger 2 and thereby provide communications with the electrical vehicle 1. The low-pass filter 6 filters EMC noise originating from the control pilot conductors CP.

Figure 2:
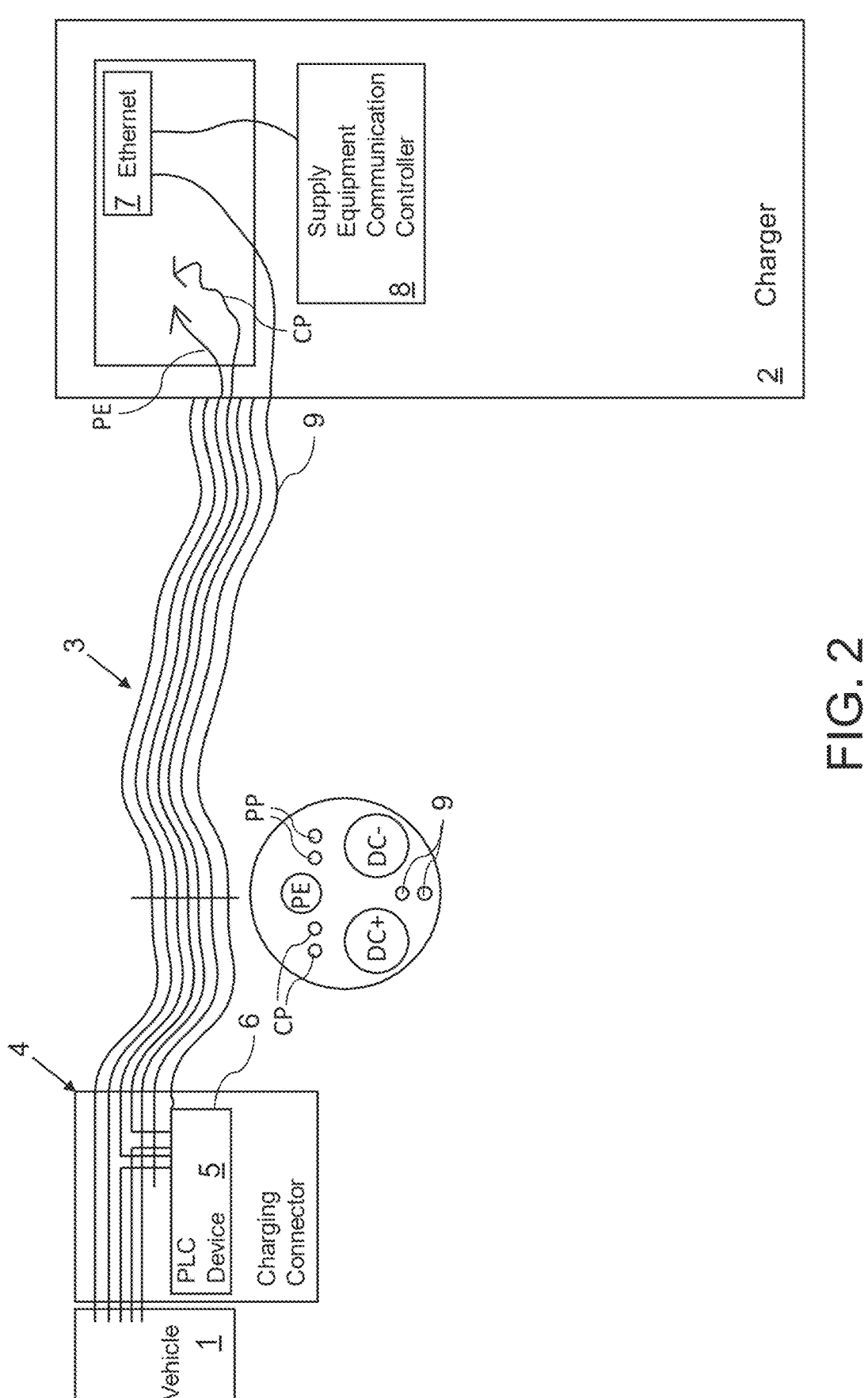
FIG. 2 shows an electric vehicle supply equipment for charging the electrical vehicle according to a preferred embodiment of the invention in a schematic view.

FIG. 2 shows an electric vehicle supply equipment for charging the electrical vehicle 1 according to a preferred embodiment of the invention. Contrary to the embodiment shown in FIG. 1, the power-line communication device 5 and the low-pass filter 6 are provided within the charging connector 4, i.e., within an enclosure of the charging connector 4 and thus respectively encapsulated by the enclosure.

The charging cable 3 comprises, in addition to the wires described before in respect to FIG. 1, at least one twisted-pair cable 9, which extends between the power-line communication device 5 provided within the charging connector and the Ethernet switch/router 7 provided within the charger 2. In such a way, communication between the charging connector 4, the power-line communication device 5 and the charger 2 is carried out via Ethernet over twisted-pair, while communication between the charging connector 4, the power-line communication device 5, and the electrical vehicle 1 is carried out via power-line communications. Thereby the power-line communication device 5 is provided as per DIN 70121 and/or ISO/IEC 15118-standard, depending on the desired charging power.

While a single twisted-pair cable 9 is sufficient for communicating according to a 1000BASE-T1 or a 100BASE-T1 standard, the charging cable 3 may comprise two or four twisted-pair cables 9 thereby enabling, for example, Ethernet over twisted-pair communication as per 100BASE-TX, 1000BASE-T or 10GBASE-T standards. By providing the at least one twisted-pair cable 9 between the charging connector 4, the power-line communication device 5, and the charger 2, the length of the charging cable can be more than 10 meters, for example, up to 40 meters in the case of 1000BASE-T1, without compromising communication quality and reliability between the charging connector 4 and the charger 2 due to electromagnetic compatibility, EMC, noise and/or noise originating from electromagnetic interference, EMI.

The charging connector 4, the charging cable 3 and the charger 2 are each provided according to a Combined Charging System, CCS, quick charging standard as per IEC 61851-23, for example as per CCS 1.0, CCS 2.0 or CCS 3.0 once available. The power-line communication device 5 is provided as a Power-over-Ethernet, PoE, device, whereby respective electrical power is provided by the Ethernet switch/router 7 via the at least one twisted-pair cable 9 to the power-line communication device 5. For shielding the charging connector 4 against electromagnetic compatibility, EMC, noise, the charging connector 4 is provided with a respective shielding e.g. a metal case.

While one or more embodiments of the invention have been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

While one or more embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS LIST

1 electrical vehicle
2 charger
3 charging cable
4 charging connector
5 power-line communication device
6 low-pass filter
7 Ethernet switch/router
8 supply equipment communication controller
9 twisted-pair cable
CP control pilot conductor
PE protective earth conductor
DC+ positive DC conductor
DC− negative DC conductor

What is claimed is:

1. An electric vehicle supply equipment (EVSE) comprising:

a charger configured for supplying a charging current for charging an electrical vehicle and comprising an Ethernet switch/router;

a charging connector configured for connecting to the electrical vehicle; and a charging cable connected with a first end to the charger and with a second end to the charging connector and configured for transmitting the charging current between the charging connector and the charger, wherein:

the charging cable comprises at least one twisted-pair cable extending between the charging connector and the charger, and the charging connector comprises a power-line communicator configured for communicating with the electrical vehicle via the power-line communicator and with the charger via Ethernet over the at least one twisted-pair cable, which extends between the power-line communicator and the Ethernet switch/router.

2. The electric vehicle supply equipment according to claim 1, whereby the power-line communicator is arranged within the charging connector and/or whereby the charging connector comprises an enclosure and the power-line communicator is arranged within the enclosure.

3. The electric vehicle supply equipment according to claim 1, whereby the charging connector comprises a low-pass filter configured for filtering out power-line communication signals between the charging connector and the charging cable.

4. The electric vehicle supply equipment according to claim 1, whereby the power-line communicator comprises a Power-over-Ethernet device.

5. The electric vehicle supply equipment according to claim 1, whereby the power-line communicator is configured for communicating with the charger according to a 1000BASE-T1 or a 100BASE-T1 standard.

6. The electric vehicle supply equipment according to claim 1, whereby the charging connector comprises a shielding configured for protecting the power-line communicator against electromagnetic compatibility noise.

7. The electric vehicle supply equipment according to claim 1, whereby the charging cable comprises one, two or four twisted-pair cables.

8. The electric vehicle supply equipment according to claim 1, whereby the charger comprises a supply equipment communication controller connected to the at least one twisted-pair cable and to an EVSE local area network.

9. The electric vehicle supply equipment according to claim 1, whereby the charging cable comprises a control pilot conductor extending between the charging connector and the charger and configured for submitting a control pilot signal, a protective earth conductor extending between the charging connector and the charger, a positive DC conductor extending between the charging connector and the charger and/or a negative DC conductor extending between the charging connector and the charger.

10. The electric vehicle supply equipment according to claim 1, whereby at least the charging connector is provided according to a Combined Charging System standard.

11. The electric vehicle supply equipment according to claim 1, whereby the at least one twisted-pair cable is integrated within the charging cable.

12. The electric vehicle supply equipment according to claim 1, wherein the charging connector is not configured to communicate with the electrical vehicle via Ethernet over the at least one twisted-pair cable.

13. The electric vehicle supply equipment according to claim 1, whereby a length of the charging cable between the first end and the second end is greater than 10 m.

14. The electric vehicle supply equipment according to claim 13, whereby the length of the charging cable between the first end and the second end is greater than or equal to 15 m.

15. The electric vehicle supply equipment according to claim 14, whereby the length of the charging cable between the first end and the second end is greater than or equal to 30 m.

16. The electric vehicle supply equipment according to claim 15, whereby the length of the charging cable between the first end and the second end is greater than or equal to 40 m.

17. The electric vehicle supply equipment according to claim 16, whereby the length of the charging cable between the first end and the second end is greater than or equal to 100 m.

* * * * *